Patented Feb. 18, 1936

2,031,538

UNITED STATES PATENT OFFICE 2,031,538

PROCESS FOR METAL CASTING

Paul C. Lemmerman, Cleveland Heights, Ohio, assignor to The Grasselli Chemical Company, Cleveland, Ohio, a corporation of Delaware No Drawing. Original application June 13, 1932, Serial No. 617,047. Divided and this application November 30, 1934, Serial No. 755,365

2 Claims. (Cl. 22—190)

Refractories made of sand bonded with a soluble silicate and baked have been used in the metal industries for linings of containers for molten metals, for molds and in many other instances where they come in contact with the molten metal.

Such refractories suffer from the disadvantages that they deteriorate when stored in a moist atmosphere and that they easily break after having been in contact with the molten metal.

I have found that the addition of relatively small amounts of calcium carbonate or other alkaline earth metal carbonate to the mixture of sand and sodium silicate from which such refractories are made, greatly improves the moisture, heat resistance and strength of the refractory and my invention comprises novel refractories composed of sand, a soluble silicate and the reaction product obtained from an alkaline earth metal carbonate and the mixture of sand and silicate, the process of making such novel refractories and their use.

I can use natural ground limestone or witherite or precipitated calcium or barium carbonate, etc., in making my novel refractories. The chemical action of the alkaline earth metal carbonate on the sand-silicate mixture is not well understood, though it might be assumed that some slow reaction takes place during the baking process which produces a supplementary bonding material between the grains of the sand. When a more reactive calcium compound, such as quick lime or hydrated lime, is incorporated into the silicate-sand mixture, a rapid reaction takes place but the so obtained reaction product has practically no effect upon the properties of the refractory. The so obtained insoluble silicate appears to be entirely inert. While I can use various carbonates, I prefer to use calcium carbonate in its various forms as the most economical addition to sand-silicate mixtures.

In the preparation of my novel refractories, I mix for instance:

87 parts washed silica sand with about 1% precipitated calcium carbonate, then add 12 parts of 42° Bé. sodium silicate of 3.25:1, $SiO_2:Na_2O$ ratio; a self sustaining mass is formed which is then shaped in a mold to the desired form and baked at a temperature of for instance 400° F. or higher, preferably in the absence of $CO_2$ as in contact with fire gases the silicate bond might be considerably weakened. Instead of sodium silicate, I can use potassium silicate and obtain similar results.

The proportion of ingredients can be varied within certain limits. Excellent refractories have been obtained with the addition of a finely divided or ground calcium carbonate in any of its forms up to 5% of the wet mixture; an amount of sodium or potassium silicate solids from 3 to 7% gives about the best bond. The composition of the silicate should be of the high silica type, when using sodium silicate its composition should be within the range of 2:1 to 3.6:1, $SiO_2$ to $Na_2O$. Enough water is used in the mixture to produce a stiff paste which is self-sustaining before baking. I can also add to my compositions small amounts of metal oxides, such as $Fe_2O_3$ or $Cr_2O_3$, which will impart to the refractories a distinctive color.

The so obtained refractories have an initial strength after baking at least equal to and in most instances greater than a similar product made without calcium carbonate; after storage for three months in a moist atmosphere, the refractories made according to my invention have from 4 to 6 times the strength of a similar composition made without addition of calcium carbonate.

The heat resistance for instance to temperature of molten iron of my novel refractories is also greatly improved and they can be used over and over again without breaking up.

The tight bond obtained by the addition of calcium carbonate does not impair the porosity of the refractory and as such porosity is necessary to allow the escape of gas when in contact with molten metal, these refractories are particularly adapted for linings or molds which come in contact with molten metals particularly molten iron.

This application is a division of my application Ser. No. 617,047 filed June 13, 1932.

I claim:

1. In a process of casting metals the step of pouring the molten metal into a container lined with a porous agglomerated material comprising sand, the grains of which are bonded together through an anhydrous unfused alkali metal silicate and an alkaline earth metal silicate.

2. In a process of casting metals the step of pouring the molten metal into a container lined with a porous agglomerated material comprising sand the grains of which are bonded together through anhydrous unfused sodium silicate and calcium silicate.

PAUL C. LEMMERMAN.